United States Patent
Chang et al.

(10) Patent No.: US 7,834,954 B2
(45) Date of Patent: Nov. 16, 2010

(54) BACKLIGHT MODULE HAVING A FIRST DIFFUSER WITH A HAZE RATIO WHICH GRADUALLY INCREASES ALONG TWO DIRECTIONS EXTENDING TO A CENTRAL REGION OF THE FIRST DIFFUSER AND A SECOND DIFFUSER WITH A HAZE RATIO GRADUALLY DECREASING AWAY FROM THE LIGHT SOURCE AND LIQUID CRYSTAL DISPLAY HAVING THE SAME

(75) Inventors: Li-Chun Chang, Miao-Li (TW);
Chien-Chung Fang, Miao-Li (TW);
Chun-Yun Pan, Miao-Li (TW);
Xiao-Hong Jing, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 67 days.

(21) Appl. No.: 12/082,789

(22) Filed: Apr. 14, 2008

(65) Prior Publication Data
US 2008/0252817 A1 Oct. 16, 2008

(30) Foreign Application Priority Data
Apr. 13, 2007 (CN) .................... 2007 2 0119526 U

(51) Int. Cl.
*G02F 1/1335* (2006.01)
*F21V 21/30* (2006.01)

(52) U.S. Cl. ............................ 349/64; 349/65; 362/620
(58) Field of Classification Search ................... 349/64
See application file for complete search history.

(56) References Cited

U.S. PATENT DOCUMENTS

| 5,386,347 | A | * | 1/1995 | Matsumoto | 362/623 |
| 5,600,455 | A | * | 2/1997 | Ishikawa et al. | 349/57 |
| 6,334,690 | B1 | * | 1/2002 | Ohkawa | 362/613 |
| 6,412,968 | B1 | * | 7/2002 | Ohkawa | 362/26 |
| 6,861,789 | B2 | | 3/2005 | Wei | |
| 2002/0181223 | A1 | * | 12/2002 | Ryu et al. | 362/31 |
| 2004/0209007 | A1 | * | 10/2004 | Satake et al. | 428/1.3 |
| 2005/0219836 | A1 | * | 10/2005 | Hung | 362/97 |

* cited by examiner

*Primary Examiner*—Andrew Schechter
*Assistant Examiner*—Dennis Y. Kim
(74) *Attorney, Agent, or Firm*—Wei Te Chung

(57) ABSTRACT

A liquid crystal display (2) includes a liquid crystal panel (29); a backlight module (20) providing light beams to the liquid crystal panel. The backlight module includes a light guide plate (23) having at least one light incident surface (231), and a light emitting surface (232) adjoining the at least one light incident surface; at least one light source (21) disposed adjacent to the at least one light incident surface; a prism sheet (25) disposed at the light emitting surface for converging light beams; and a first diffuser (26) disposed at the prism sheet for scattering the light beams therethrough. A haze ratio of the first diffuser changes according to the brightness differentia over a brightness distribution of the prism sheet for attaining a substantially uniform surface light beams output.

9 Claims, 4 Drawing Sheets

BACKLIGHT MODULE HAVING A FIRST DIFFUSER WITH A HAZE RATIO WHICH GRADUALLY INCREASES ALONG TWO DIRECTIONS EXTENDING TO A CENTRAL REGION OF THE FIRST DIFFUSER AND A SECOND DIFFUSER WITH A HAZE RATIO GRADUALLY DECREASING AWAY FROM THE LIGHT SOURCE AND LIQUID CRYSTAL DISPLAY HAVING THE SAME

FIELD OF THE INVENTION

The present invention relates to backlight modules for use in liquid crystal displays (LCDs) or the like, and especially to a backlight module with uniform surface light beam output and liquid crystal display having the same.

BACKGROUND

Most portable electronic devices such as laptop and notebook computers, mobile phones and game devices have viewing screens unlike the cathode-ray-tube (CRT) monitors of conventional desktop computers. Users generally expect the viewing screens to provide performance equal to that of CRT monitors. To meet this demand, computer manufacturers have sought to build flat panel displays (FPDs) offering superior resolution, color and contrast, while at the same time requiring minimal power consumption. LCDs are one type of FPD which satisfy these expectations. However, the liquid crystals of an LCD are not self-luminescent. Rather, the LCD generally needs a surface emitting device such as backlight module which offers sufficient luminance (brightness) in a wide variety of ambient light environments.

As shown in FIG. 7, a typical backlight module 10 includes a reflector 11, a planar light guide plate 12, a second diffuser 13, a prism sheet 14, a first diffuser 15, two light sources 16 disposed at two opposite sides of the planar light guide plate 12. The reflector 11, the planar light guide plate 12, the second diffuser 13, the prism sheet 14 and the first diffuser 15 are stacked together in that order from bottom to top. The light guide plate 12 includes a light output surface 122, a bottom surface 123 opposite to the light output surface 122, and two light incident surfaces 121 interconnecting the light output surface 122 and the bottom surface 123. The reflector 11 is disposed adjacent to the bottom surface 123. The second diffuser 13, the prism sheet 14 and the first diffuser 15 are disposed upon the light output surface 122 in that order. The two light sources 16 are disposed opposite to the two light incident surfaces 123, respectively.

In operation, light beams emitted from the light sources 16 enter the light guide plate 12. Some of the light beams are reflected and then exit through the output surface 122, and other light beams directly exit through the output surface 122. All of the light beams that exit through the output surface 122 then transmit through the second diffuser 13, the prism sheet 14 and the first diffuser 15, and finally illuminate a liquid crystal panel (not shown). The first and the second diffuser 15, 13 are respectively used to scatter light beams transmitting therethrough, and the prism sheet 14 is used to control light beams transmitting therethrough to emit out along a predetermined direction generally perpendicular to the liquid crystal panel, and converge the light beams to a central region of the backlight module 10. The first and the second diffusers 15, 13 each have a haze ratio. Generally, the haze ratio of the first diffuser 15 is larger than that of the second diffuser 13 for assuring the utilization ratio of the light beams.

However, when the two light sources 16 are disposed at two opposite sides of the light guide plate 12, a brighter region may be created at the central region of the backlight module 10. In addition, the convergence function of the prism sheet 14 further enhances the brightness of the central region of the backlight module 10. Thus, the backlight module 10 has a brighter central region and a comparatively darker peripheral region. Therefore, the backlight module 10 can not produce a uniform surface light beams output, which lowers the display quantity, reduce the viewing angle.

What is needed, therefore, is a backlight module and a liquid crystal display which can provide uniform surface light beams output.

SUMMARY

An exemplary backlight module includes a light guide plate having at least one light incident surface, and a light emitting surface adjoining the at least one light incident surface; at least one light source disposed adjacent to the at least one light incident surface; a prism sheet disposed at the light emitting surface for converging light beams; and a first diffuser disposed at the prism sheet for scattering the light beams therethrough. A haze ratio of the first diffuser changes according to the brightness differentia over a brightness distribution of the prism sheet for attaining a substantially uniform surface light beams output.

An exemplary liquid crystal display includes a liquid crystal panel; a backlight module providing light beams to the liquid crystal panel. The backlight module includes a light guide plate having at least one light incident surface, and a light emitting surface adjoining the at least one light incident surface; at least one light source disposed adjacent to the at least one light incident surface; a prism sheet disposed at the light emitting surface for converging light beams; and a first diffuser disposed at the prism sheet for scattering the light beams therethrough. A haze ratio of the first diffuser changes according to the brightness differentia over a brightness distribution of the prism sheet for attaining a substantially uniform surface light beams output.

Other advantages and novel features will become more apparent from the following detailed description when taken in conjunction with the accompanying drawings.

DETAILED DESCRIPTION OF PREFERRED EMBODIMENTS

Figure 1:
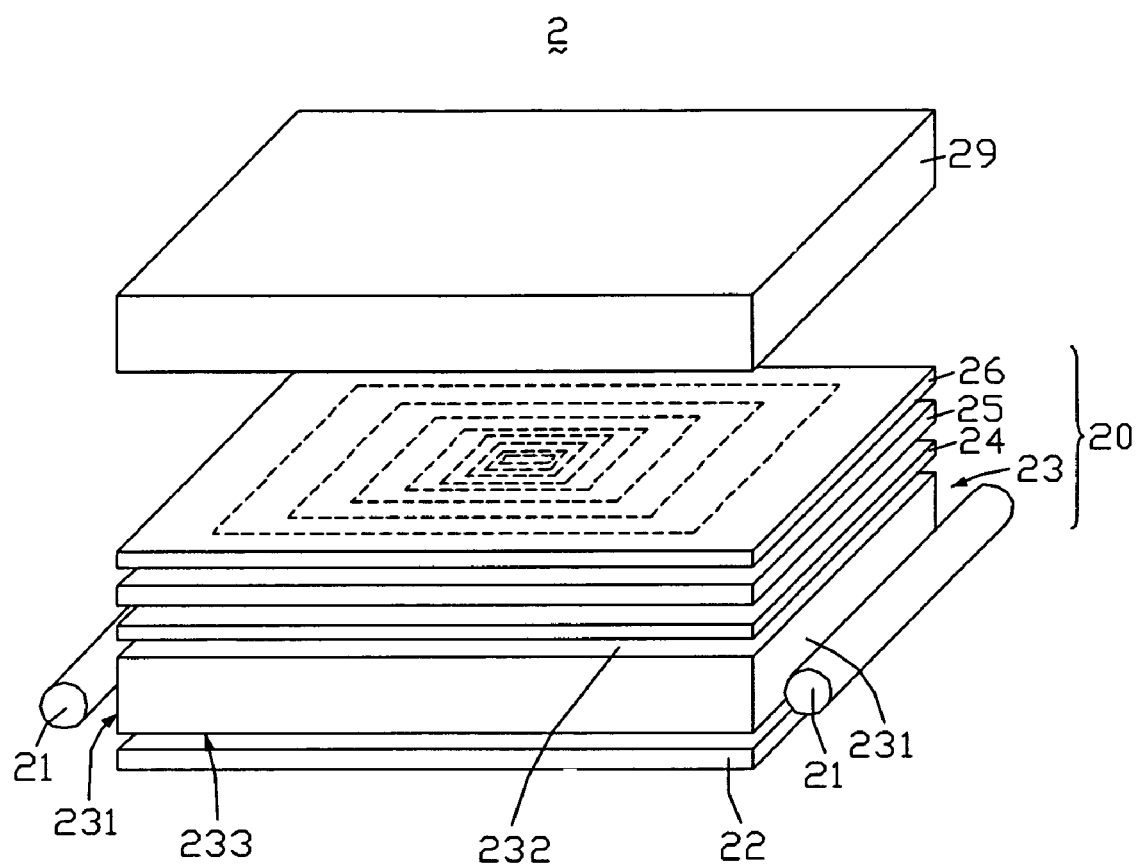
FIG. 1 is an exploded, isometric view of a liquid crystal display according to a first embodiment of the present invention, which includes a first diffuser and a second diffuser.

Referring to FIG. 1, an exploded, isometric view of a liquid crystal display according to a first embodiment of the present invention is shown. The liquid crystal display has a liquid crystal panel 29 and a backlight module 200 used to provide uniform surface light beams to the liquid crystal panel 29.

The backlight module 200 includes two light sources 21, a reflector 22, a light guide plate 23, a first diffuser 26, a second diffuser 24 and a prism sheet 25. The reflector 22, the light guide plate 23, the second diffuser 24, the prism sheet 25 and the first diffuser 26 are stacked together in that order from bottom to top. The two light sources 21 are disposed at two opposite sides of the light guide plate 23.

The light guide plate 23 includes a light output surface 232, a bottom surface 233 opposite to the light output surface 232, and two opposite light incident surfaces 231 interconnecting the light output surface 232 and the bottom surface 233. The reflector 22 is disposed adjacent to the bottom surface 233. The second diffuser 24 is disposed at the light output surface 232, and the two light sources 21 are respectively disposed adjacent to the two opposite light incident surfaces 231. The light sources 21 are cold cathode field lamp (CCFL).

Figure 2:
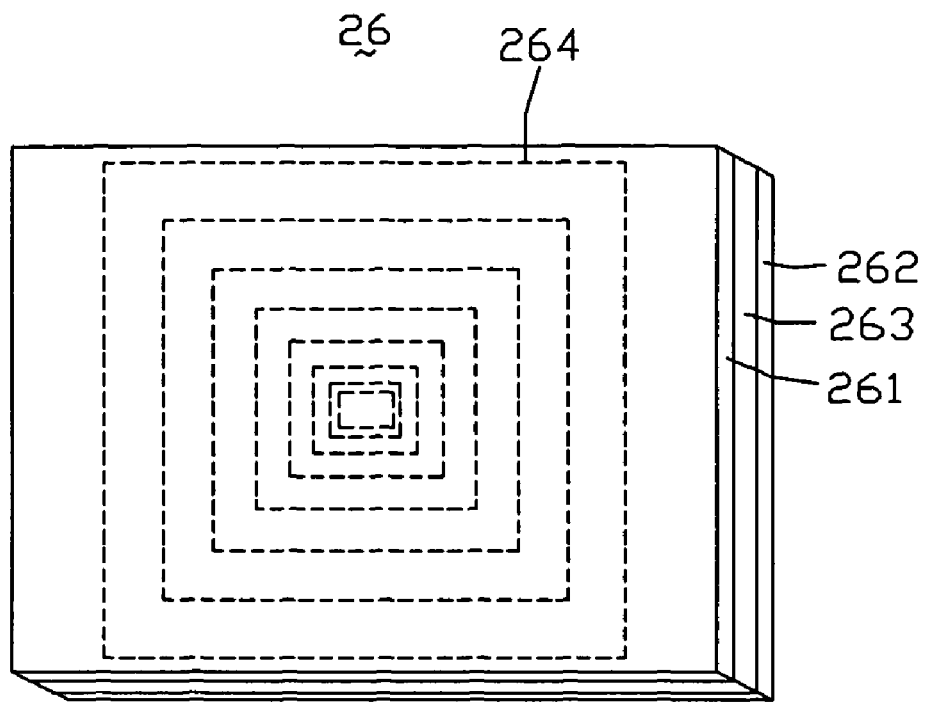
FIG. 2 is a schematic, isometric view of the first diffuser of FIG. 1.

Referring to FIG. 2, a schematic, isometric view of the first diffuser 26 of the backlight module 200 is shown. The first diffuser 26 has a diffusing layer 261 doped with a plurality of spherical particles 264, an electrostatic prevention layer 262, and a substrate layer 263 between the diffusing layer 261 and the electrostatic prevention layer 262. The distribution density of the spherical particles 264 gradually increases along directions from a peripheral region to a central region of the diffuser 26, which makes the haze ratio of the diffuser 26 gradually increase along directions from the peripheral region to a central region thereof, corresponding to brightness distribution at a whole light emitting surface of the prism sheet 25. That is the distribution density of the spherical particles 264 increases along four directions from four sides of the diffuser 26 to the central region thereof. The diffusing layer 261 is made from a light guiding resin, such as polymethyl methacrylate or Makrolan. The substrate 263 is made from high photopermeability material, such as polyester, polymethyl methacrylate or Makrolan, which is used as a carrier for the diffusing layer 261 and the electrostatic prevention layer 262. The electrostatic prevention layer 262 is used to prevent the diffusing layer 261 from electrostatic discharge damage.

Figure 3:
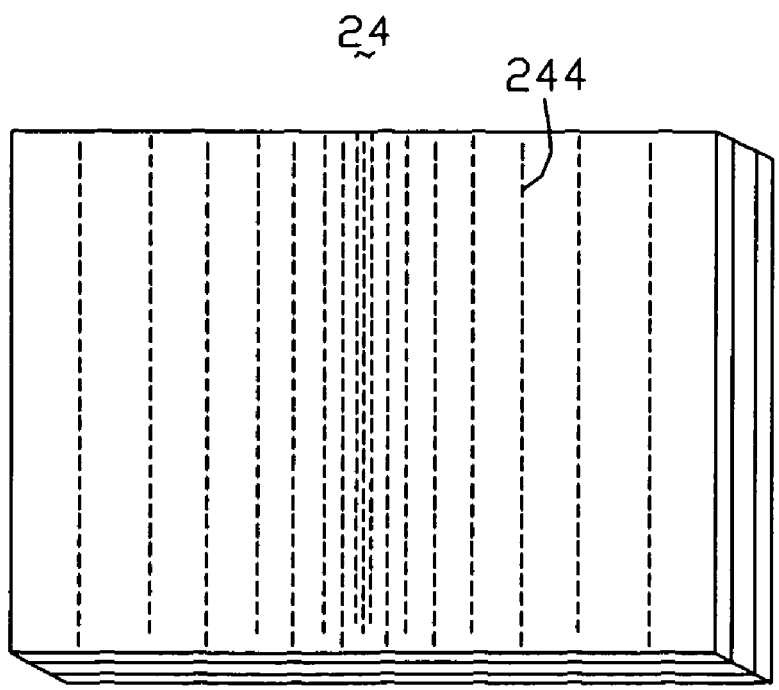
FIG. 3 is a schematic, isometric view of the second diffuser of FIG. 1.

Referring to FIG. 3, a schematic, isometric view of the second diffuser 24 of the backlight module 200 is shown. The second diffuser 24 has a similar structure to that of the second diffuser 24 except that the distribution density of spherical particles 244 increases along two directions from two opposite sides of the second diffuser 24 to the central region thereof, corresponding to a brightness distribution at the whole light output surface 232 of the light guide plate 23. The two opposite sides are respectively adjacent to the two light sources 21.

In operation, light beams from the two light sources 21 are guided into the light guide plate 23 through the two opposite light incident surfaces 231. After that, a part of light beams are directly transmitted out from the light output surface 232 of the light guide plate 23, and another part of light beams are reflected to the light output surface 232 by the reflector 22. Then, light beams sequentially transmit through the second diffuser 24, the prism sheet 25 and the first diffuser 26. The second and the first diffusers 24, 26 are respectively used to scatter the light beams transmitted through for attaining a uniform light beams output, and the prism sheet 25 control the transmitting direction of light beams along a direction substantially perpendicular to the backlight module 20, and converge the light beams to the central region of the backlight module 20. Thus, the backlight module 20 can provide a uniform surface light beams to a display panel for showing images.

Because the two light sources 21 are oppositely disposed, the central region of the light guide plate 23 emits surface light beams having a higher brightness, and the two opposite ends adjacent to the two light sources 21 thereof emit surface light beams having a comparatively lower brightness. The second diffuser 24 having a higher haze ratio at the corresponding central region and a lower haze ratio at the corresponding two opposite sides can compensate the brightness differentia. Thus, the second diffuser 24 can uniform the light beams therethrough. In addition, the prism sheet 25 adjusts the transmitting direction of the light beams from the second diffuser 24 and converges it to the central region thereof. The first diffuser 26 having a higher haze ratio at the corresponding central region and a lower haze ratio at the corresponding peripheral region can compensate the brightness differentia. Thus, the second diffuser 24 can further uniform the light beams therethrough. Therefore, the backlight module 20 can attain a uniform surface light beams output, and provide a uniform surface light to the liquid crystal panel 29 for assuring a good display quality.

Figure 4:
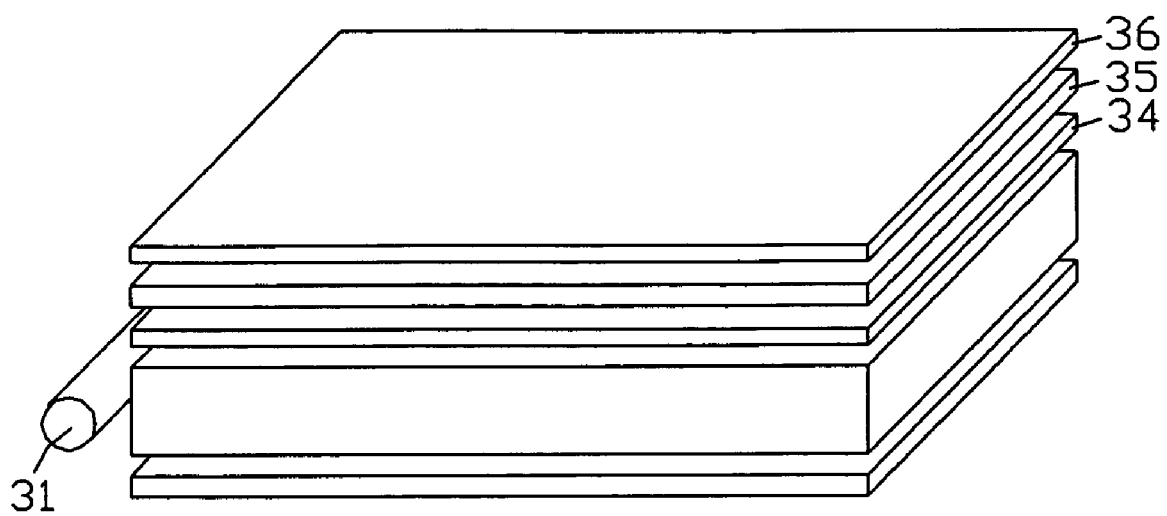
FIG. 4 is an exploded, isometric view of a liquid crystal display according to a second embodiment of the present invention, which includes a first diffuser and a second diffuser.
Figure 5:
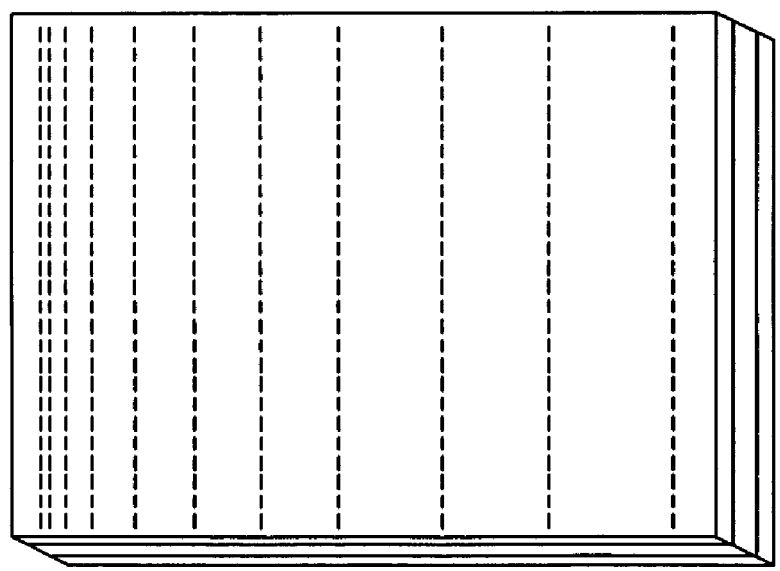
FIG. 5 is a schematic, isometric view of the first diffuser of FIG. 4.
Figure 6:
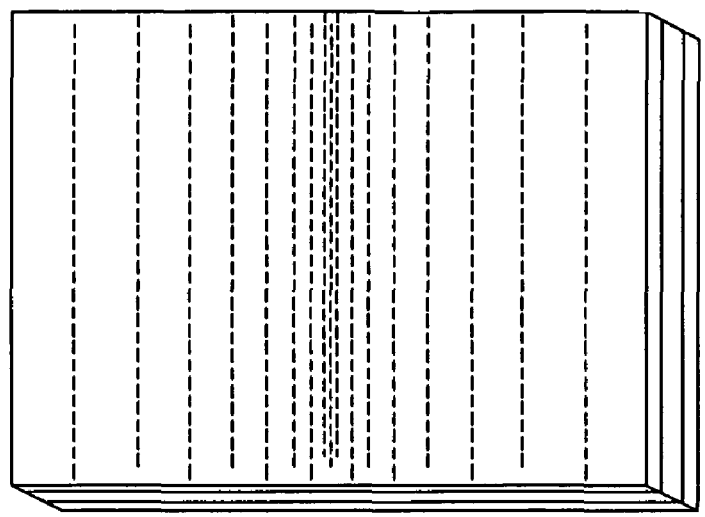
FIG. 6 is a schematic, isometric view of the second diffuser of FIG. 4.
Figure 7:
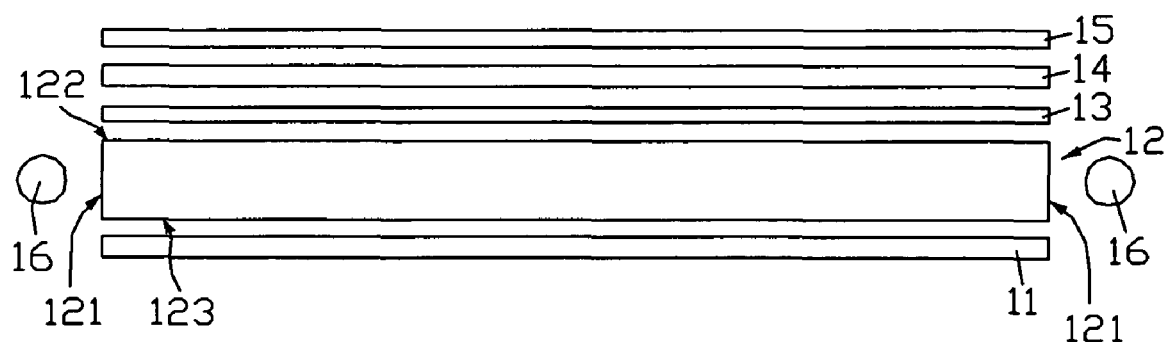
FIG. 7 is a schematic, exploded, side view of a typical backlight module.

Referring to FIGS. 4 to 6, an exploded, isometric view of a backlight module of an LCD according to a second embodiment of the present invention is shown. The backlight module 30 has a similar structure to that of the backlight module 20 of the first embodiment except that only one light source 31 is provided. The backlight module 30 further has a second diffuser 34 and a first diffuser 36. The second diffuser 34 has a gradually changed haze ratio, decreasing along a direction far away the light source 31. The first diffuser 36 also has a gradually changed haze ratio, which increases along two directions from two opposite sides to the central region thereof. The two directions correspond to a converging direction of a prism sheet 35 thereof.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A backlight module, comprising:
   a light guide plate comprising one light incident surface, and a light emitting surface adjoining the light incident surface;
   one light source disposed adjacent to the light incident surface, the light source capable of emitting light;
   a prism sheet disposed above the light emitting surface for converging the light beams;
   a first diffuser disposed above the prism sheet for scattering the light beams, and comprising two first opposite sides and two second opposite sides that are connected to the two first opposite sides; and
   a second diffuser disposed above the light guide plate and below the prism sheet for scattering the light beams;

wherein a haze ratio of the second diffuser gradually decreases along a direction extending away from the light source according to a brightness distribution of the light guide plate, and a haze ratio of the first diffuser gradually increases along two directions extending from each first opposite side to a central region of the first diffuser, and remains the same along two directions extending from each second opposite side to the central region of the first diffuser.

2. The backlight module as claimed in claim 1, wherein the first and the second diffusers respectively comprise a diffusing layer, an electrostatic prevention layer, and a substrate layer between the diffusing layer and the electrostatic prevention layer, the diffusing layer comprising a plurality of spherical particles doped therein.

3. The backlight module as claimed in claim 2, wherein a distribution density of the spherical particles determines the haze ratios of the first and the second diffusers.

4. The backlight module as claimed in claim 2, wherein the diameters of the plurality of spherical particles are in the range from 5 μm to 30 μm.

5. A liquid crystal display comprising:
a liquid crystal panel; and
a backlight module providing light beams to the liquid crystal panel, the backlight module comprising:
  a light guide plate comprising one light incident surface, and a light emitting surface adjoining the light incident surface;
  one light source disposed adjacent to the light incident surface, the light source capable of emitting light;
  a prism sheet disposed above the light emitting surface for converging the light beams;
  a first diffuser disposed above the prism sheet for scattering the light beams, and comprising two first opposite sides and two second opposite sides that are connected to the two first opposite sides; and
  a second diffuser disposed above the light guide plate and below the prism sheet for scattering the light beams;
  wherein a haze ratio of the second diffuser decreases along a direction extending away from the light source according to a brightness distribution of the light guide plate, and a haze ratio of the first diffuser gradually increases along two directions extending from each first opposite side to a central region of the first diffuser, and remains the same along two directions extending from each second opposite side to the central region of the first diffuser.

6. The liquid crystal display as claimed in claim 5, wherein the first and the second diffusers respectively comprise a diffusing layer, an electrostatic prevention layer, and a substrate layer between the diffusing layer and the electrostatic prevention layer, the diffusing layer comprising a plurality of spherical particles doped therein.

7. A backlight module, comprising:
a light guide plate comprising a light incident surface;
a light source positioned opposite the light incident surface for emitting light into the light incident surface;
a first diffuser positioned over the light guide plate for scattering the light beams emitted from the light guide plate;
a prism sheet positioned over the first diffuser for converging the light beams emitted from the first diffuser; and
a second diffuser positioned over the prism sheet for scattering the light beams emitted from the prism sheet, and comprising two first opposite sides and two second opposite sides that are connected to the two first opposite sides;
wherein a haze ratio of the first diffuser gradually decreases along a direction extending away from the light source according to a brightness distribution of the light guide plate, and a haze ratio of the second diffuser gradually increases along two directions extending from each first opposite side to a central region of the second diffuser, and remains the same along two directions extending from each second opposite side to the central region of the second diffuser.

8. The backlight module as claimed in claim 7, wherein each of the first and second diffusers comprises a diffusing layer, an electrostatic prevention layer, and a substrate layer between the diffusing layer and the electrostatic prevention layer, the diffusing layer comprising a plurality of spherical particles doped therein.

9. The backlight module as claimed in claim 8, wherein the diameters of the plurality of spherical particles are in the range from 5 μm to 30 μm.

* * * * *